United States Patent
Jung et al.

(10) Patent No.: US 9,253,715 B2
(45) Date of Patent: Feb. 2, 2016

(54) METHOD AND APPARATUS FOR DETECTING AN ACCESS POINT IN A RADIO ACCESS SYSTEM

(75) Inventors: In Uk Jung, Anyang-si (KR); Young Soo Yuk, Anyang-si (KR); Jin Sam Kwak, Anyang-si (KR); Ki Seon Ryu, Anyang-si (KR); Wook Bong Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 68 days.

(21) Appl. No.: 14/112,829

(22) PCT Filed: Feb. 28, 2012

(86) PCT No.: PCT/KR2012/001504
§ 371 (c)(1),
(2), (4) Date: Nov. 15, 2013

(87) PCT Pub. No.: WO2012/144731
PCT Pub. Date: Oct. 26, 2012

(65) Prior Publication Data
US 2014/0066054 A1    Mar. 6, 2014

Related U.S. Application Data

(60) Provisional application No. 61/477,596, filed on Apr. 20, 2011.

(51) Int. Cl.
*H04W 48/16* (2009.01)
*H04W 36/14* (2009.01)
*H04W 88/06* (2009.01)
(Continued)

(52) U.S. Cl.
CPC .............. *H04W 48/16* (2013.01); *H04W 36/14* (2013.01); *H04W 88/06* (2013.01); *H04W 16/14* (2013.01); *H04W 36/00* (2013.01)

(58) Field of Classification Search
None
See application file for complete search history.

(56) References Cited

U.S. PATENT DOCUMENTS

| 2005/0249173 A1* | 11/2005 | Salokannel et al. .......... 370/338 |
| 2009/0005099 A1 | 1/2009 | Jung et al. |
| 2009/0323659 A1 | 12/2009 | Zhang |

(Continued)

FOREIGN PATENT DOCUMENTS

| KR | 10-2008-0086781 A | 9/2008 |
| KR | 10-2009-0013275 A | 2/2009 |

(Continued)

*Primary Examiner* — Charles Appiah
*Assistant Examiner* — Margaret G Mastrodonato
(74) *Attorney, Agent, or Firm* — Birch, Stewart, Kolasch & Birch, LLP

(57) ABSTRACT

The present disclosure relates to a method for performing communication between a terminal and a base station in a radio access system supporting multi-radio access technology (RAT), the method being characterized in that it comprises the steps of performing an access procedure between a first base station supporting a cellular radio access technology and a second base station supporting a short-range radio access technology; the second base station receiving, from the first base station and through a first radio scanner, control information relating to the transmission of an identification signal (IDS) for detecting the second base station of the terminal; and the second base station transmitting the IDS through the first radio channel to the terminal based on the received control information, wherein the first radio channel is the radio channel corresponding to the first base station.

7 Claims, 4 Drawing Sheets

(51) Int. Cl.
*H04W 36/00* (2009.01)
*H04W 16/14* (2009.01)

(56) References Cited

U.S. PATENT DOCUMENTS

| | | | |
|---|---|---|---|
| 2010/0222062 A1* | 9/2010 | Chou et al. | 455/449 |
| 2011/0134887 A1 | 6/2011 | Jeon et al. | |
| 2011/0194530 A1* | 8/2011 | Tinnakornsrisuphap et al. | 370/331 |
| 2011/0237261 A1* | 9/2011 | Meshkati et al. | 455/438 |

FOREIGN PATENT DOCUMENTS

| KR | 10-2010-0000980 A | 1/2010 |
|---|---|---|
| KR | 10-2010-0016780 A | 2/2010 |
| WO | WO 2008/117966 A1 | 10/2008 |

* cited by examiner

METHOD AND APPARATUS FOR DETECTING AN ACCESS POINT IN A RADIO ACCESS SYSTEM

CROSS REFERENCE TO RELATED APPLICATIONS

This application is the National Phase of PCT/KR2012/001504 filed on Feb. 28, 2012, which claims priority under 35 U.S.C. 119(e) to U.S. Provisional Application No. 61/477,596 filed on Apr. 20, 2011, all of which are hereby expressly incorporated by reference into the present application.

BACKGROUND OF THE INVENTION

1. Field of the Invention

The present invention relates to a wireless access system, and more particularly, to a method and apparatus for detecting a Wi-Fi access point (AP).

2. Related Art

In general, cellular mobile station (or devices) in a cellular network detect or scan Wi-Fi access points (APs) by using the following methods.

1. Manuel detection: When a user turns on a Wi-Fi radio of a cellular device, the cellular device searches for Wi-Fi APs located near a user, i.e., the cellular device.

2. Automatic detection: A cellular network triggers a search command for APs on the basis of specific information. The specific information may be a location, an application, a network preference, quality of service (QoS), etc. According to the search command, the cellular device, i.e., the user, turns on the Wi-Fi radio to search for specific APs located near the user.

However, the aforementioned two methods must perform blind scanning to search for information of APs accessible or usable by the cellular device.

The blind scanning of the cellular device requires an excessive time and power consumption. In addition, it is not guaranteed that an AP is within a coverage in which the blind scanning is performed.

In order to solve the excessive time and power consumption in the blind scanning process, AP detection methods coordinated by a network are proposed.

That is, there are several methods in which a cellular network provides cellular devices with information useful for APs existing inside or outside cell coverage of the cellular device so that the cellular devices can rapidly access to the AP.

Herein, the useful information may be 1) list information of APs existing near a user or inside coverage of a base station and 2) pre-provision WLAN information for rapid network (re)entry of a cellular device to a specific AP.

As described above, the most important time consumed in a process of accessing to the WLAN is a time in which a device searches for an AP.

Accordingly, it has been proposed many methods and solutions for decreasing a time consumed when a device searches for an AP during the device operates in a cellular network.

SUMMARY OF THE INVENTION

The present invention provides procedures for defining an identification signal (IDS) for identifying an access point (AP) by a mobile station and for transmitting the IDS in order to solve a problem of a time and power consumed when the mobile station searches for the AP.

In an aspect, a method of performing communication between a mobile station and a base station in a wireless access system supporting a multi-radio access technology (RAT) is provided. The method includes performing an access procedure between a first base station supporting a cellular RAT and a second base station supporting a local area network RAT, receiving, by the second base station from the first base station through a first radio channel, control information related to transmission of an identification signal (IDS) used to detect, by the mobile station, the second base station, and transmitting the IDS, by the second base station, to the mobile station through the first radio channel based on the received control information. The first radio channel is a radio channel corresponding to the first base station.

The control information may include at least one of a downlink resource region for IDS transmission, an IDS transmission type, IDS transmit power information, and IDS duration information.

The performing of the access procedure may comprises synchronizing, by the second base station, with the first base station in a time domain by using a preamble of the first base station.

The radio channel may be a superframe, and the IDS may be transmitted in every single superframe for a specific number of consecutive superframes.

The method may further include performing, by the second base station, a network entry procedure with the mobile station through a second radio channel. The second radio channel may be a radio channel corresponding to the second base station.

The first radio channel may be an 802.16 channel, and the second radio channel may be an 802.11 channel.

In another aspect, a method of performing communication between a mobile station and a base station in a wireless access system supporting a multi-radio access technology (RAT) is provided. The method includes transmitting and receiving, by the mobile station, data with respect to a first base station supporting a cellular RAT, receiving, by the mobile station from a second base station supporting a local area network RAT, an identification signal (IDS) used to detect the second base station through a first radio channel which is a radio channel corresponding to the first base station, and turning on, by the mobile station, a second radio channel which is a radio channel corresponding to the second base station.

The method may further include reporting, by the mobile station, to the first base station a result of the receiving the IDS, and receiving, by the mobile station, control information required to perform a handover from the first base station to the second base station.

The control information may include at least one of a service set identifier (SSID) of the second base station, an Internet protocol (IP) address, channel information, transmit power information, and a disconnection time with respect to the first base station.

The method may further include performing, by the mobile station, a scanning procedure with respect to the second base station through the second radio channel, and performing, by the mobile station, a network entry procedure with respect to the second base station through the second radio channel.

In another aspect, an access point (AP) for performing communication with a mobile station in a wireless access system supporting a multi-radio access technology (RAT) is provided. The AP includes a radio frequency (RF) unit for transmitting and receiving a radio signal with respect to an external entity, and a controller operatively coupled to the RF unit. The controller is configured to perform an access procedure with respect to a base station supporting a cellular RAT, control the RF unit to receive control information related to transmission of an identification signal (IDS) for detection, by the mobile station, of the AP from the base station through a first radio channel, and control the RF unit to transmit the IDS to the mobile station through the first radio channel based on the received control information. The first radio channel is a radio channel corresponding to the base station.

In another aspect, a mobile station for performing communication with respect to a base station in a wireless access system supporting a multi-radio access technology (RAT) is provided. The mobile station includes a radio frequency (RF) unit for transmitting and receiving a radio signal with respect to an external entity, and a controller operatively coupled to the RF unit. The controller provides control to perform an access procedure with respect to a first base station supporting a cellular RAT, controls the RF unit to receive an identification signal (IDS) used to detect the second base station from a second base station supporting a short range RAT through a first radio channel which is a radio channel corresponding to the first base station, and provides control to turn on a second radio channel which is a radio channel corresponding to the second base station.

The present invention has an advantage in that a time consumed when a mobile station accesses to a wireless local area network (WLAN) access point (AP) and resultant power consumption can be decreased by defining an identification signal (IDS) capable of identifying an AP.

The present invention also has an advantage in that a mobile station can transmit and receive data through a cellular network and a WLAN in a multi-radio access technology (RAT) network.

DESCRIPTION OF EXEMPLARY EMBODIMENTS

Figure 1:
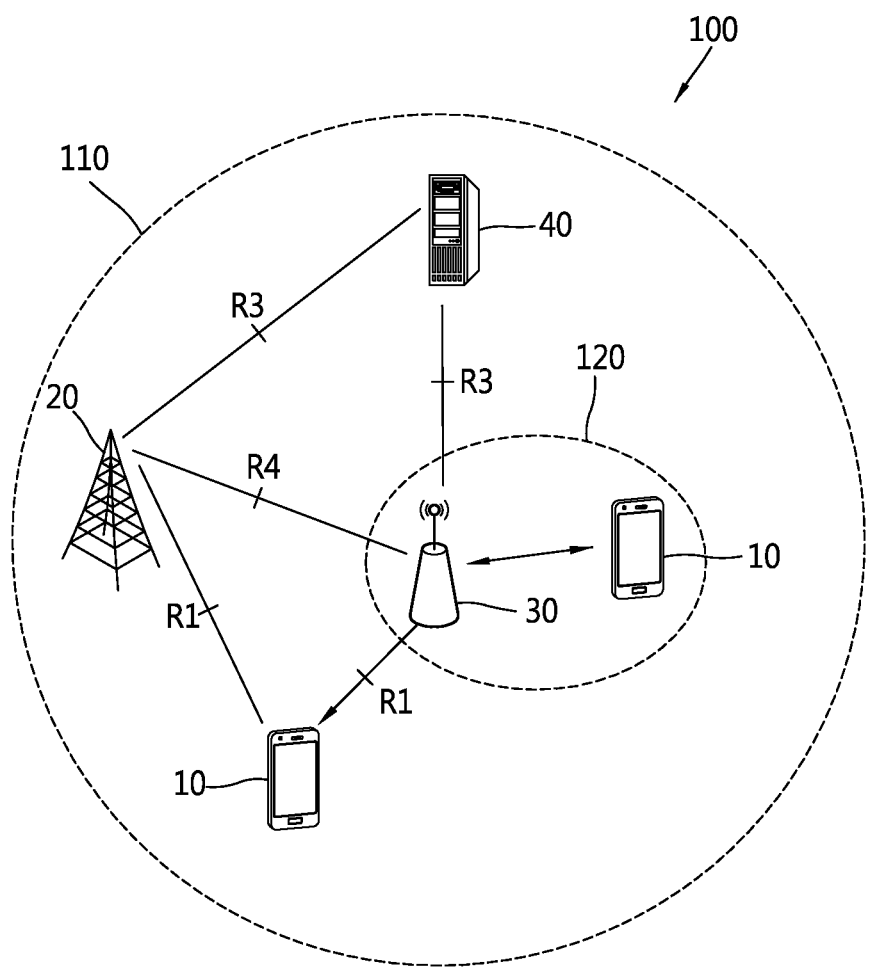
FIG. 1 is a concept diagram showing a multi-RAT network to which an embodiment of the present invention can be applied.

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like.

The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as institute of electrical and electronics engineers (IEEE) 802.11 (Wi-Fi), IEEE 802.16 (WiMAX), IEEE 802.20, E-UTRA (evolved UTRA), and the like. IEEE 802.16m, an evolution of IEEE 802.16e, provides backward compatibility with a system based on IEEE 802.16e.

The UTRA is part of a universal mobile telecommunications system (UMTS).

3GPP (3rd generation partnership project) LTE (long term evolution) is part of an evolved UMTS (E-UMTS) using the E-UTRA, which employs the OFDMA in downlink and the SC-FDMA in uplink. LTE-A (advanced) is an evolution of 3GPP LTE.

Hereinafter, preferred embodiments according to the present invention are described in detail with reference to the accompanying drawings. The same or similar elements are assigned the same reference numerals irrespective of their reference numerals, and a redundant description thereof is omitted. Furthermore, in describing the present invention, a detailed description of the known functions and constructions will be omitted if it is deemed to make the gist of the present invention unnecessarily vague. Furthermore, the accompanying drawings are provided to help easily understand the spirit of the present invention, and it is to be noted that the spirit of the present invention should not be limited by the spirit of the present invention. The spirit of the present invention should be interpreted as being extended up to all changes, equivalents to substitutes other than the accompanying drawings.

Multi RAT Network (or System)

Hereinafter, a multi radio access technology (RAT) network is described briefly.

A multi radio access technology (RAT) network refers to a radio communication environment in which two or more heterogeneous networks are present and a mobile station (MS) is able to access two or more heterogeneous networks and perform communication.

A heterogeneous network (or a heterogeneous system) refers to a network using a communication method different from a communication method used in a specific network on the basis of the specific network. For example, a WiMAX network, that is an example of a mobile communication system, and a Wi-Fi network, that is an example of WLAN, correspond to heterogeneous networks.

In addition, RAT is a technique type used in radio access. For example, RAT can include a GSM/EDGE radio access network (GERAN), a UMTS terrestrial radio access network (UTRAN), an evolved-UMTS terrestrial radio access network (E-UTRAN), WiMAX, LTE (-A), and Wi-Fi. That is, a GERAN, a UTRAN, an E-UTRAN, WiMAX, and/or Wi-Fi are mixed in the same area.

Hereinafter, a Wi-Fi AP detection method of a mobile station (MS) in a multi-RAT network proposed in the present invention will be described in detail with reference to the accompanying drawings.

FIG. 1 is a concept diagram showing a multi-RAT network to which an embodiment of the present invention can be applied.

Referring to FIG. 1, a multi-RAT network 100 may include a primary network 110 and a secondary network 120.

Herein, the primary network 110 and the secondary network 120 may be expressed respectively as a primary system and a secondary system. The primary network 110 includes a mobile station (MS) 10, a base station (BS) 20, a core service network (CSN) 40, and the secondary network 120. The secondary network 120 includes an MS 10 and an access point (AP) 30.

Herein, the MS 10 is an MS capable of performing communication by accessing to two or more heterogeneous networks, that is, an MS supporting a multi-RAT, and can be expressed as a 'multi-RAT MS, a 'multi system MS', or a 'multi-mode MS'.

In addition, the AP 30 can be expressed as a 'simple cellular AP' or a 'coordinated AP (CAP)'. Hereinafter, an AP performing a function proposed in the present invention is expressed as a 'CAP'.

The CAP 30 may be a typical Wi-Fi AP, or may be a device different from the Wi-Fi AP. That is, if the CAP 30 is constructed differently from the Wi-Fi AP, the CAP has an egg form, and can be connected to the Wi-Fi AP.

In addition, the primary network 110 is a network having wide range coverage, and may be a cellular network. For example, the primary network 110 may be a network supporting WiMAX or LTE(-A). In addition, the primary network 110 refers to a network which always has a status with the MS 10. That is, the primary network refers to a network which remains in an active state, a sleep mode state, or an idle mode state.

The secondary network 120 is a network having short range coverage, and may be a wireless local area network (WLAN). For example, the secondary network 120 may be Wi-Fi. Herein, the secondary network 120 may optionally be a network which can be added to or deleted from a multi-RAT network. In addition, the secondary network may be used in general for transmission and reception of data. which requires a higher bandwidth (BW). Therefore, a specific flow (QoS) may be mapped to use the secondary network.

In addition, in the multi-RAT network 100, the primary network and the secondary network may be connected in a wired or wireless fashion. That is, a BS (i.e., a contact point with respect to the MS) of the primary network and a BS (i.e., a contact point with respect to the MS) of the secondary network may be connected in a wired or wireless fashion through a backbone network.

Hereinafter, unless otherwise specified, for convenience of explanation, it is assumed in the following description that the primary network 110 is a network (i.e., WiMAX) supporting IEEE 802.16 and the secondary network 120 is a network (i.e., Wi-Fi) supporting IEEE 802.11.

Therefore, a BS corresponding to the primary network is denoted by an 'ABS', and a BS corresponding to the secondary network is denoted by a 'CAP'. In addition, an access with the primary network may be the same meaning as an 'access with an ABS', and an access with the secondary network may be the same meaning as an 'access with an AP'.

In order to prevent the MS from excessively consuming a time in searching APs located near the MS, an AP coupled with the MS through an 802.11 link or a simple cellular AP broadcasts an identification signal (IDS) capable of identifying the AP or the simple cellular AP at a frequency band of a cellular network in an in-band manner. Herein, the AP or the simple cellular AP, that is, an AP which broadcasts the IDS, is called a coordinated AP (CAP).

Herein, the IDS indicates an identification signal for detecting a heterogeneous network. Therefore, in order to search for neighboring APs, the MS may automatically detect the IDS without having to scan another frequency allocation (FA) other than a current FA.

Herein, the MS performs communication with a macro BS (or a serving BS, an eNB, an ABS, a BS, an ASN).

In addition, in order for the MS to detect the IDS at a frequency band of a cellular network, the CAP is synchronized with the cellular network. Therefore, the CAP receives a preamble or beacons of ABSs to synchronize with the cellular network in a time domain.

In addition, the CAP may have a communication channel with the ABSs to acquire information on a downlink (DL) resource region reserved to transmit the IDS to the MS. Herein, the communication channel may be connected between the CAP and the ABS through a backhaul or wirelessly.

The reservation of the DL resource region information for the IDS transmission may be actively requested by the MS or may be allocated in an unsolicited manner by the network (or ABS).

In addition, the ABS may allocate specific identification codes for the IDS to all CAPs in the network. Herein, the specific identification codes may be unique in a multi-RAT network or may be unique only within a cell including only the ABS. The reason that the specific identification codes are unique only within the cell is for a reutilization purpose.

That is, the ABS or the network reserves a specific DL resource region for the IDS transmission, and the reserved specific DL resource region is reported to MSs in the multi-RAT network.

Hereinafter, aspects to be considered to implement a CAP will be described.

1. Resource Reservation (1) The CAP may be allocated a unique IDS in a cell, and the IDS may be provided from an ABS or a network through a backhaul.

(2) A DL resource region for transmitting the IDS is reserved for a dependent CAP in the cell. The DL resource region may be periodically reserved. In addition, the CAP may transmit the IDS to MSs during a repetitive duration, and the repetitive duration is defined as an 'IDS duration (or interval)'.

(3) The DL resource region reserved for the IDS transmission may be reported to MSs in a network in a broadcast or unicast manner.

(4) If the MS receives the IDS during the IDS duration, a received IDS is reported to the ABS to coordinate available offloading through a WLAN network.

As described above, the resource reserved to allow the MS to rapidly detect a Wi-Fi AP is 1) an IDS and 2) a (periodic) DL resource region for IDS transmission.

2. Power (1) Since another entity other than an ABS transmits an in-band signal, transmit power may differ between the ABS and the CAP.

(2) Therefore, receive power may differ at an MS side, and thus may cause a decoding problem.

(3) Although the CAP uses the same MCS encoding technique similarly to the ABS, differentiated power transmission may cause a decryption error at the MS side.

(4) Therefore, the CAP must properly configure power setting as described below.

1) The CAP measures preamble power of the ABS.

2) The CAP configures the power setting by considering the measured preamble's receive power.

3) Basis on the configured power setting, the CAP transmits an IDS so that a neighboring MS receives the IDS by using similar power setting of the ABS.

4) Therefore, the ABS reports its current power setting to the CAP in order to facilitate power measurement in the CAP.

Hereinafter, a design of a DL resource region reserved for the aforementioned IDS transmission will be described.

An ABS or a network may reserve a specific DL resource region of the ABS so that a CAP belonging to the network can transmit a WLAN IDS in a specific resource region.

Herein, the specific DL resource region is not a resource region always reserved for IDS signaling, and may schedule a resource for IDS transmission through a radio resource currently not in use.

Herein, the DL resource region may be scheduled through one of the followings.

1. Region of primary preamble or region of secondary preamble
2. Region of dedicated LBS zone In IEEE 802.16m, it is located in a first symbol of a first subframe in a last frame of each DL-LBS zone superframe 3. Region of MAP or A-MAP
4. Data payload region in MAC message In addition, the WLAN IDS may be any one of the followings.

1. Primary/secondary preamble code
2. MAC message
3. A-MAP (802.16m) or MAP (802.16e)
4. LTE preamble code Hereinafter, a case where an IDS is transmitted by using a preamble code will be described briefly.

An ABS or a network may reuse preamble codes currently in use. The reused preambles may be identified in a time domain.

Therefore, the reused preambles are used as an IDS at a scheduled time in which normal preambles are not clearly transmitted. In this case, the MS may recognize that the preambles are used for the purpose of the IDS. Herein, an existence of a WLAN access network may be reported through the preambles for the IDS usage.

In addition, a channel (e.g., FA) in which a WLAN operates can be known through the preamble codes. In this case, a plurality of preamble codes may be used as an IDS for identifying each of a plurality of channels of one WLAN AP.

Herein, a WLAN AP may be classified through a preamble code set. The classification may be performed by grouping or discriminating preamble codes per category.

That is, the WLAN AP may be divided into the following category.

1. Common AP: There is no limitation in AP access.
2. Personal AP: Only MSs having a partnership capable of accessing to an AP can access to a personal AP.
3. Membership registration dependent AP (AP considering a payment plan): MSs having a specific membership can access to a (level of a data plan) membership registration dependent AP.

Figure 2:
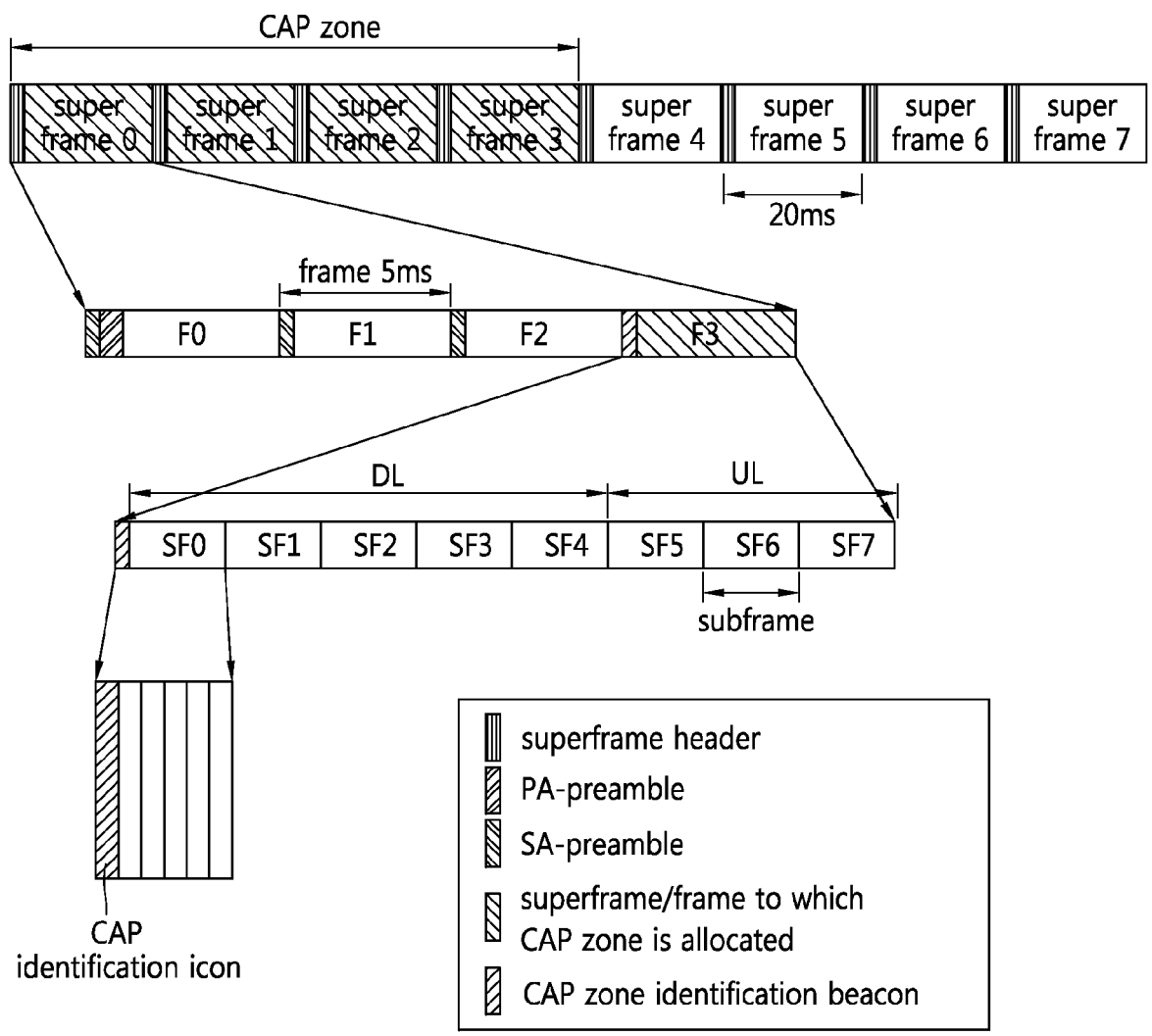
FIG. 2 shows an example of a frame structure in which a CAP zone is allocated according to an embodiment of the present invention.

FIG. 2 shows an example of a frame structure in which a CAP zone is allocated according to an embodiment of the present invention, Referring to FIG. 2, a WLAN identification beacon transmitted by a CAP is transmitted in the CAP zone. In addition, the identification beacon may be transmitted through several superframes. For example, in IEEE 802.16m, the CAP zone may be allocated in every single superframe for 'N' consecutive superframes. Herein, the CAP zone may be allocated in various patterns.

A null region is used as a resource region for IDS transmission. An ABS performs scheduling so that any preamble or data is not transmitted in the null region.

In addition, allocation of a DL resource region for the IDS transmission may be transmitted to all of MSs and the CAP through a backhaul network or an air interface by using a MAC message.

IDS Signaling Procedure

If a CAP is installed in a multi-RAT network (or a cellular network), the CAP receives (or is allocated) unique IDS related information in a cell through an ABS or a network (through a backhaul). Herein, the CAP uses a cellular network and a heterogeneous network. The IDS related information may be an IDS, a DL resource region for IDS transmission, etc.

In addition, the DL resource region for the IDS transmission is reserved by the ABS or the network for dependent CAPs in the cell. Herein, the network refers to an entity of a higher layer than the ABS. The DL resource region may be periodically reserved, and the CAP may transmit the IDS to the MS with a repetitive duration (IDS duration). Herein, the DL resource region reserved for the IDS may be reported to MSs depending on the CAP in a broadcast or unicast manner.

In addition, if the MS receives the IDS during an IDS duration, the MS reports a received IDS measurement to the ABS to coordinate available offloading through a WLAN network.

If it is determined that the ABS triggers a process of offloading to the CAP with respect to MSs related with the IDS, the ABS transmits a WLAN offload command including proper coordination information to the MS. Herein, the proper coordination information includes WLAN AP channel information (e.g., channel/frequency information), a WLAN service set identifier (SSID), WLAN capability information, a WLAN IP address, a disconnect time for disconnecting a connection with a cellular network, a paging group identifier (PGID) or deregistration identifier (DID) for a context preserved in the cellular network.

When the MS is out of a WLAN coverage, the PGID or the DID is used to avoid a complete disconnection from the cellular network, and thus a fast network re-entry can be performed.

A WLAN offload may be triggered by an MS side, if a channel measurement result or a specific threshold for QoS is satisfied.

As described above, if a WLAN offload procedure is triggered, the MS turns on an IEEE 802.11 interface, and starts to search for APs on the basis of information provided in advance. The ABS transmits to the CAP a context to be transmitted to the MS, and the CAP uses the context received from the ABS.

The context received from the ABS may be the same as information related to a fast MS access, information related to an MS identification, information related to security and authentication check, etc.

MS's all data, control and voice traffic path transmitted and received by the MS through a cellular network may be re-indicated to a WLAN AP to provide a seamless service in a WLAN.

Figure 3:
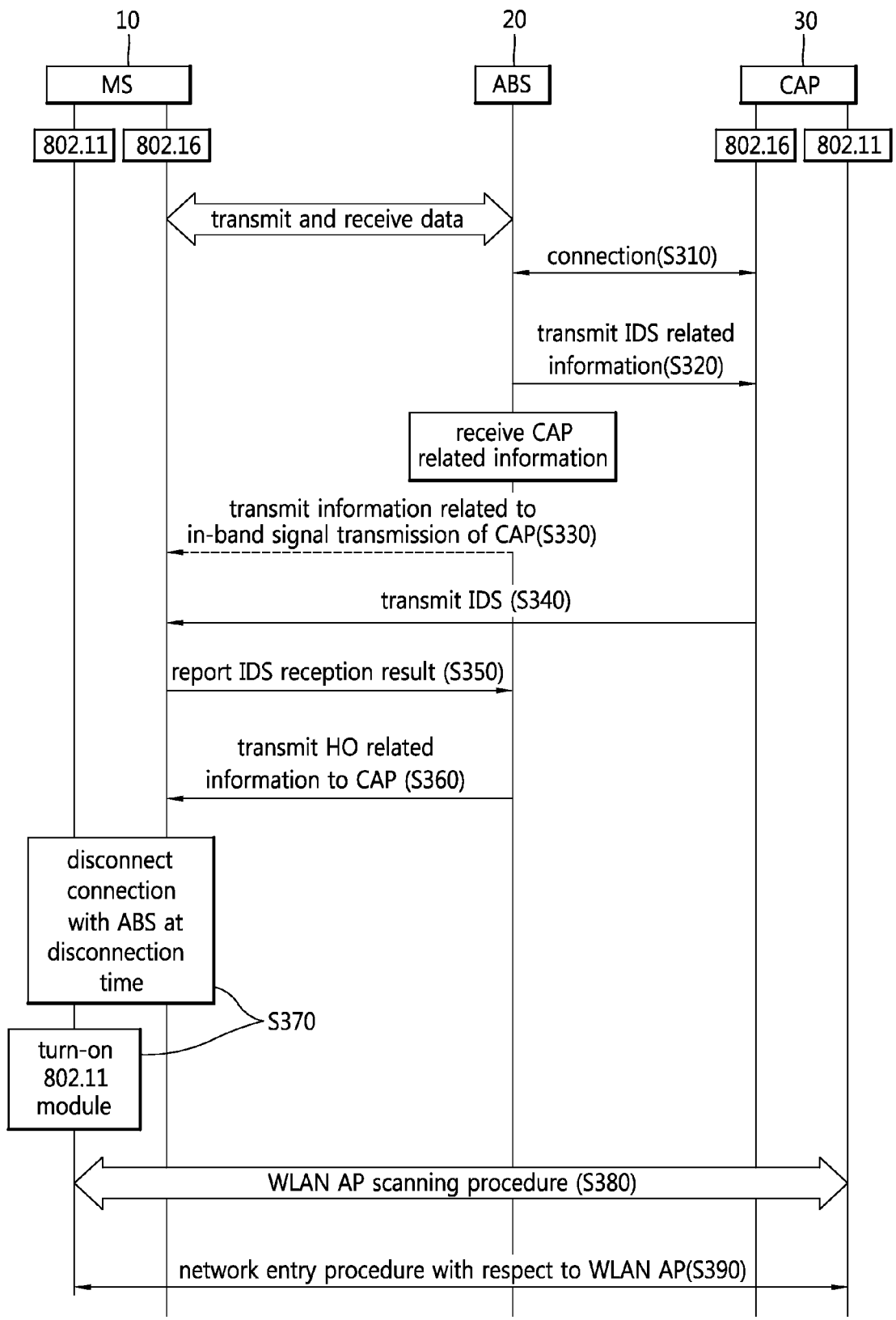
FIG. 3 is a flowchart showing a method of detecting an AP by using an IDS according to an embodiment of the present invention.

FIG. 3 is a flowchart showing a method of detecting an AP by using an IDS according to an embodiment of the present invention.

Referring to FIG. 3, an MS exchanges data with an ABS via an 802.16 radio. Herein, the MS is a multi-RAT MS supporting 802.16 and 802.11, and the ABS corresponds to a BS supporting 802.16.

Thereafter, if a CAP is installed in a cellular network, that is, a network of the ABS, the CAP accesses (or connects) to the ABS through an 802.16 radio channel (step S310). Herein, the CAP may transmit a specific signal via the 802.16 radio through a process of synchronizing with the ABS.

Thereafter, the ABS transmits IDS related information, i.e., a DL resource region for IDS transmission, an IDS, a transmission schedule, an FA (or channel), etc., to the CAP in a cell (step S320).

Herein, the network (i.e., a higher layer entity of the ABS) may report information regarding the CAP and dependent APs to the ABS.

Thereafter, the ABS transmits an information list related to in-band signal transmission of the CAP to the MS (step S330). Herein, the list includes a CAP type, CAP system information, an IDS transmission schedule, IDS transmit power of the CAP, an IDS code, etc. In addition, the list may be transmitted to MSs in a broadcast or unicast manner. Step S330 may be omitted.

Thereafter, the CAP transmits the IDS to the MS on the basis of the IDS related information (step S340). The IDS transmission may be transmitted in an IDS duration periodically according to a transmission schedule reported by the network or the ABS.

Thereafter, the MS reports a measurement result of the IDS received from the CAP (step S350).

Thereafter, the ABS transmits coordination information for performing a handover (HO) of the MS from the ABS to the CAP with respect to specific data (e.g., flow) (step S360). The coordination information includes an SSID of an AP for performing the HO, an IP address, a flow, channel information, power information, information for synchronization, capability information, disconnection time information with respect to the ABS, connection time information with respect to the AP, a paging group identifier (PGID), etc.

Thereafter, the MS disconnects a connection with the ABS in a disconnection time included in the coordination information, and turns on an 802.11 radio module simultaneously or after disconnecting the connection with the ABS (step S370).

Thereafter, the MS performs a scanning procedure with respect to the CAP in an 802.11 channel (step S380). The scanning procedure may include scanning for the CAP and a process of reporting a result of performing the scanning.

Thereafter, the MS performs a (re)entry procedure with respect to a WLAN AP (step S390).

Hereinafter, a power setting process for IDS transmission will be additionally described.

Considering ABS Power Setting

A CAP performs a specific IDS power configuration by referring to received signal power of an ABS.

As described above, the performing of the IDS power setting of the CAP is for allowing IDS receive power in an MS to set IDS transmit power in the CAP similarly to a case of receiving a signal from the ABS.

Therefore, the CAP may configure power setting of the CAP by measuring received signal power of the ABS.

For example, if received power of an ABS preamble code is N dBm (herein, receive power in the MS is N-M), the CAP configures IDS transmit power so that a neighboring MS receives an IDS with N-M power. Herein, the value M is a power loss generated due to a path loss and an interference factor.

Considering CAP Coverage

If an IDS transmission boundary exceeds coverage of a CAP, an MS cannot access to the CAP when receiving an IDS.

Therefore, the CAP must set IDS transmit power of the CAP to a value equal to or less than a transmit power value corresponding to the coverage of the CAP.

If the MS detects an IDS transmitted from the CAP and triggers an offload process but the MS fails to search for a desired CAP, the CAP may regulate strength of IDS transmit power to be greater than the coverage of the CAP. In this case, the MS reports to an ABS that an access to the CAP has failed. Herein, the MS may report to the ABS about the access failure by including received IDS power (e.g., RSSI, CINR, etc), and a received IDS index.

If a report indicating the failure in the access to the AP is received from the MS, the ABS may transmit the following two types of command.

(1) To allow IDS transmit power in the CAP to be decreased to be equal to or less than a CAP coverage.

(2) To allow a CAP coverage to be increased so that IDS transmit power is equal to or greater than the CAP coverage.

Hereinafter, a preference on an access network of an MS will be described.

The MS may have a preference (or priority) for an access network or a re-access AP irrespective of trigger conditions.

If the MS has a preference on an access to a specific WLAN AP, information of a preferred AP may be reported to an ABS.

As described above, accessing to a target AP which is a preferred AP may be more preferentially performed by the MS than triggering for an access from a cellular network to the target AP through a WLAN offload process.

In addition, the preference of the MS on the AP may have other offloading/handover trigger values, and the MS is allowed to access to the preferred AP until an allowed QoS is satisfied.

The embodiments and modifications described above may be combined with one another. Accordingly, each embodiment may be made alone or in combination, as necessary. Such combination may be easily made by those skilled in the art, and thus, the detailed description thereof is skipped. Although no further description is provided, such combinations are not excluded from the present invention, and should be construed as included in the present invention.

The above-described embodiments and modifications may be made by various means, for example, in hardware, firmware, software, or in a combination thereof.

When implemented in hardware, the methods according to the embodiments of the present invention may be embodied by one or more application specific integrated circuits (ASICs), digital signal processors (DSPs), digital signal processing devices (DSPDs), programmable logic devices (PLDs), field programmable gate arrays (FPGAs), processors, controllers, microcontrollers, or microprocessors.

When implemented in firmware or software, the methods according to the embodiments of the present invention may be embodied in modules, procedures or functions that perform the above-described functions or operations. The software codes may be stored in a memory unit and driven by a processor. The memory unit may be positioned in or outside of the processor and may transmit or receive data to/from the processor by various known means.

For example, the methods according to the embodiments of the present invention may be stored in a storage medium (for example, an internal memory, a flash memory, a hard disk, etc.) and may be implemented as codes or commands in a software program that may be executed by a processor (for example, a microprocessor). This will be described with reference to FIG. 4.

Figure 4:
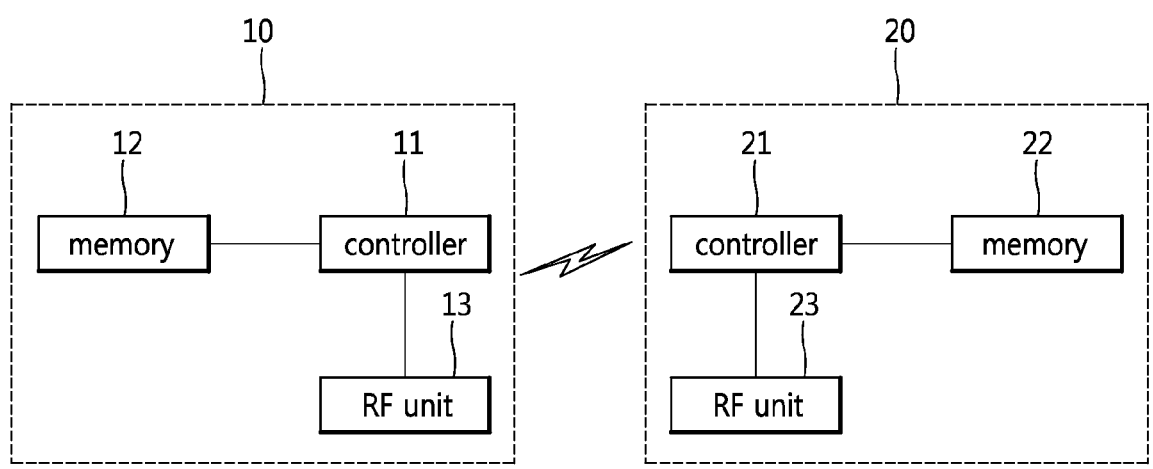
FIG. 4 is a block diagram showing internal structures of an MS and a BS in a multi-RAT network to which an embodiment of the present invention can be applied.

FIG. 4 is a block diagram showing internal structures of an MS and a BS in a multi-RAT network to which an embodiment of the present invention can be applied.

An MS 10 includes a controller 11, a memory 12, and a radio frequency (RF) unit 13.

The MS 10 can be fixed or mobile and can be called another terminology, such as user equipment (UE), a user terminal (UT), a subscriber station (SS), a wireless device, or an advanced mobile station (AMS). Furthermore, the MS includes the concept of a multi-RAT MS, and a multi-mode MS.

Further, the MS also includes a display unit, a user interface unit, etc.

The controller 11 implements the proposed functions, procedures, and/or methods. Layers of a wireless interface protocol may be implemented by the controller 11.

The memory 12 is coupled to the controller 11, and stores a protocol or parameter for performing wireless communication. That is, the memory 12 stores an operating system of the MS, an application, and a general file.

The RF unit 13 is coupled to the controller 11, and transmits and/or receives an RF signal.

In addition, the display unit displays a variety of information of the MS, and may be a well-known element such as liquid crystal display (LCD), organic light emitting diodes (OLED), etc. The user interface unit may be constructed by combining well-known user interfaces such as a keypad, a touch screen, etc.

A BS 20 includes a controller 21, a memory 22, and a radio frequency (RF) unit 23.

Here, the BS 20 commonly refers to a fixed station communicating with the MS 10, and the BS 20 can be called another terminology, such as a NodeB, a base transceiver system (BTS), an access point, or an ASN. One or more cells can be present in one BS 20.

The controller 21 implements the proposed functions, procedures, and/or methods. Layers of a wireless interface protocol may be implemented by the controller 21.

The memory 22 is coupled to the controller 21, and stores a protocol or parameter for performing wireless communication.

The RF unit 23 is coupled to the controller 21, and transmits and/or receives an RF signal.

The controllers 11 and 21 may include an application-specific integrated circuit (ASIC), a separate chipset, a logic circuit, and/or a data processing unit. The memories 12 and 22 may include a read-only memory (ROM), a random access memory (RAM), a flash memory, a memory card, a storage medium, and/or other equivalent storage devices. The RF units 13 and 23 may include a baseband circuit for processing an RF signal. When the embodiment of the present invention is implemented in software, the aforementioned methods can be implemented with a module (i.e., process, function, etc.) for performing the aforementioned functions. The module may be stored in the memories 12 and 22 and may be performed by the controllers 11 and 21.

The memories 12 and 22 may be located inside or outside the controllers 11 and 21, and may be coupled to the controllers 11 and 21 by using various well-known means.

In addition, the terminology used herein is for the purpose of describing particular embodiments only and is not intended to be limiting of the invention. Unless otherwise defined, all terms used herein have the same meaning as commonly understood by one of ordinary skill in the art to which this invention pertains, and should not be interpreted as having an excessively comprehensive meaning nor as having an excessively contracted meaning. If technical terms used herein is erroneous that fails to accurately express the technical idea of the present invention, it should be replaced with technical terms that allow the person in the art to properly understand. The general terms used herein should be interpreted according to the definitions in the dictionary or in the context and should not be interpreted as an excessively contracted meaning.

As used herein, the singular forms are intended to include the plural forms as well, unless the context clearly indicates otherwise. In the present application, it is to be understood that the terms such as "including" or "having" etc., are intended to indicate the existence of the features, numbers, operations, actions, components, parts, or combinations thereof disclosed in the specification, and are not intended to preclude the possibility that one or more other features, numbers, operations, actions, components, parts, or combinations thereof may exist or may be added.

It will be understood that although the terms "first" and "second" are used herein to describe various elements, these elements should not be limited by these terms. These terms are only used to distinguish one element from another element. For example, a first component may be termed a second component, and similarly, a second component may be termed a first component without departing from the scope of the present invention.

When a component is mentioned as being "connected" to or "accessing" another component, this may mean that it is directly connected to or accessing the other component, but it is to be understood that there are no intervening components present. On the other hand, when a component is mentioned as being "directly connected" to or "directly accessing" another component, it is to be understood that there are no intervening components present.

The following embodiments correspond to combinations of elements and features of the present invention in prescribed forms. And, it is able to consider that the respective elements or features are selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. It is apparently understandable that claims failing to be explicitly cited in the appended claims are combined to construct new embodiments or can be included as new claims by amendment after filing the application.

What is claimed is:

1. A method of performing communication between a mobile station and a base station in a wireless access system supporting a multi-radio access technology (RAT), the method comprising:

performing an access procedure between a first base station supporting a cellular RAT and a second base station supporting a local area network RAT;

receiving, by the second base station from the first base station through a first radio channel, first control information related to transmission of an identification signal (IDS) used to detect, by the mobile station, the second base station, wherein the first control information includes all of a downlink resource region for IDS transmission, an IDS transmission type, and IDS transmit power information; and transmitting the IDS, by the second base station, to the mobile station through the first radio channel based on the received first control information, wherein the first radio channel is a radio channel corresponding to the first base station, wherein the first radio channel is a superframe, wherein the IDS is transmitted in every single superframe for a specific number of consecutive superframes, wherein information related to the specific number of consecutive superframes is broadcasted or unicasted to the first base station, wherein, after the transmission of the IDS, a measurement result of the IDS is reported from the mobile station to the first base station, wherein, after the reporting of the measurement result of the IDS, second control information required to perform a handover is transmitted from the first base station to the mobile station, and wherein the second control information includes all of a service set identifier (SSID) of the second base station, an Internet protocol (IP) address of the second base station, channel information of the second base station, transmit power information of the second base station, and a disconnection time with respect to the first base station.

2. The method of claim 1, wherein the performing of the access procedure comprises:

synchronizing, by the second base station, with the first base station in a time domain by using a preamble of the first base station.

3. The method of claim 1, further comprising performing, by the second base station, a network entry procedure with the mobile station through a second radio channel, and wherein the second radio channel is a radio channel corresponding to the second base station.

4. The method of claim 3, wherein the first radio channel is an 802.16 channel, and wherein the second radio channel is an 802.11 channel.

5. A method of performing communication between a mobile station and a base station in a wireless access system supporting a multi-radio access technology (RAT), the method comprising:

transmitting and receiving, by the mobile station, data with respect to a first base station supporting a cellular RAT, wherein first control information related to transmission of an identification signal (IDS) is transmitted from the first base station to a second base station supporting a local area network RAT, and wherein the first control information includes all of a downlink resource region for IDS transmission, an IDS transmission type, and IDS transmit power information;

receiving, by the mobile station from the second base station, the IDS used to detect the second base station through a first radio channel which is a radio channel corresponding to the first base station;

reporting, by the mobile station, to the first base station a measurement result of the IDS;

receiving, by the mobile station, second control information required to perform a handover from the first base station to the second base station, wherein the second control information includes all of a service set identifier (SSID) of the second base station, an Internet protocol (IP) address of the second base station, channel information of the second base station, transmit power information of the second base station, and a disconnection time with respect to the first base station; and turning on, by the mobile station, a second radio channel which is a radio channel corresponding to the second base station, wherein the first radio channel is a superframe, wherein the IDS is transmitted in every single superframe for a specific number of consecutive superframes, and wherein information related to the specific number of consecutive superframes is broadcasted or unicasted to the first base station.

6. The method of claim 5, further comprising:

performing, by the mobile station, a scanning procedure with respect to the second base station through the second radio channel; and performing, by the mobile station, a network entry procedure with respect to the second base station through the second radio channel.

7. An access point (AP) for performing communication with a mobile station in a wireless access system supporting a multi-radio access technology (RAT), the AP comprising:

a radio frequency (RF) unit for transmitting and receiving a radio signal with respect to an external entity; and a controller operatively coupled to the RF unit, wherein the controller is configured to:

perform an access procedure with respect to a base station supporting a cellular RAT;

control the RF unit to receive first control information related to transmission of an identification signal (IDS) for detection, by the mobile station, of the AP from the base station through a first radio channel, wherein the first control information includes all of a downlink resource region for IDS transmission, an IDS transmission type, and IDS transmit power information; and control the RF unit to transmit the IDS to the mobile station through the first radio channel based on the received first control information, wherein the first radio channel is a radio channel corresponding to the base station, wherein the first radio channel is a superframe, wherein the IDS is transmitted in every single superframe for a specific number of consecutive superframes, wherein information related to the specific number of consecutive superframes is broadcasted or unicasted to the first base station, wherein, after the transmission of the IDS, a measurement result of the IDS is reported from the mobile station to the first base station, wherein, after the reporting of the measurement result of the IDS, second control information required to perform a handover is transmitted from the first base station to the mobile station, and wherein the second control information includes all of a service set identifier (SSID) of the second base station, an Internet protocol (IP) address of the second base station, channel information of the second base station, transmit power information of the second base station, and a disconnection time with respect to the first base station.

* * * * *